United States Patent
Nakanuma

(10) Patent No.: US 10,855,681 B2
(45) Date of Patent: Dec. 1, 2020

(54) DATA COMMUNICATION METHOD

(71) Applicant: Koga Electronics Co., Ltd., Kyoto (JP)

(72) Inventor: Tadashi Nakanuma, Shiga (JP)

(73) Assignee: Koga Electronics Co., Ltd., Shiga (JP)

( * ) Notice: Subject to any disclaimer, the term of this patent is extended or adjusted under 35 U.S.C. 154(b) by 0 days.

(21) Appl. No.: 16/475,698

(22) PCT Filed: Mar. 17, 2017

(86) PCT No.: PCT/JP2017/010988
§ 371 (c)(1),
(2) Date: Jul. 3, 2019

(87) PCT Pub. No.: WO2018/131176
PCT Pub. Date: Jul. 19, 2018

(65) Prior Publication Data
US 2019/0379662 A1 Dec. 12, 2019

(30) Foreign Application Priority Data
Jan. 11, 2017 (JP) .................................. 2017-002347

(51) Int. Cl.
*H04L 29/06* (2006.01)
*H04L 5/00* (2006.01)
(Continued)

(52) U.S. Cl.
CPC ........ *H04L 63/0876* (2013.01); *H04L 5/0055* (2013.01); *H04L 7/0008* (2013.01); *H04L 61/2007* (2013.01); *H04L 9/3228* (2013.01)

(58) Field of Classification Search
CPC . H04L 63/0876; H04L 5/0055; H04L 7/0008; H04L 61/2007; H04L 9/3228
See application file for complete search history.

(56) References Cited

U.S. PATENT DOCUMENTS 6,606,645 B1 * 8/2003 Cohen .................... H04L 29/06
  709/203
8,819,187 B1 * 8/2014 Hofmann ............ H04L 67/2814
  709/219

(Continued)

FOREIGN PATENT DOCUMENTS

JP   2005-122695   5/2005
JP   2005-193590   7/2005

(Continued)

OTHER PUBLICATIONS

International Search Report dated Jun. 14, 2017 in corresponding International patent application No. PCT/JP2017/010988.

*Primary Examiner* — Ghodrat Jamshidi
(74) *Attorney, Agent, or Firm* — Kirschstein, Israel, Schiffmiller & Pieroni, P..C.

(57) ABSTRACT

Communication devices to an IP network through communication lines to each of which a unique identification number is assigned and, in each communication device, the identification numbers of other communication devices allowed to communicate with the each communication device are registered, and the communication lines are uniquely connected for data communication by a three-way handshake based on the identification numbers. A communication line activates another communication line. When a connection is established, the connection is disconnected. It is determined at the activated communication line if a response signal from the activating communication line as a response to a call back signal sent to the activating communication line at a predetermined timing arrives, and it is determined at the activating communication line if a call back signal from the activated communication line arrives. Data communication is performed only when both the activating and activated communication lines are validated.

3 Claims, 1 Drawing Sheet

(51) Int. Cl.
*H04L 7/00* (2006.01)
*H04L 29/12* (2006.01)
*H04L 9/32* (2006.01)

(56) References Cited

U.S. PATENT DOCUMENTS

| | | | | |
|---|---|---|---|---|
| 2003/0074434 A1* | 4/2003 | Jason, Jr. | ............ | H04L 63/1458 709/223 |
| 2004/0024795 A1* | 2/2004 | Hind | .................... | G06F 16/275 |
| 2004/0073678 A1* | 4/2004 | Border | ................. | H04L 45/306 709/227 |
| 2005/0094637 A1* | 5/2005 | Umesawa | ........... | H04L 41/0893 370/389 |
| 2006/0056445 A1* | 3/2006 | Lin | ....................... | H04L 41/082 370/465 |
| 2010/0023593 A1* | 1/2010 | Matsuo | ............... | H04L 61/2076 709/207 |
| 2011/0185073 A1* | 7/2011 | Jagadeeswaran | ..... | H04L 69/161 709/228 |
| 2013/0117437 A1* | 5/2013 | Tseng | .................. | H04L 61/2575 709/224 |
| 2014/0173090 A1* | 6/2014 | Davis | .................. | H04L 43/0852 709/224 |
| 2015/0134806 A1* | 5/2015 | Zou | ..................... | G06F 11/1417 709/223 |
| 2018/0076955 A1* | 3/2018 | Shields | .................. | H04W 4/70 |
| 2018/0191478 A1* | 7/2018 | Uhling | .................. | H04L 5/0055 |
| 2019/0303581 A1* | 10/2019 | Quatmann | ......... | D03D 15/0033 |

FOREIGN PATENT DOCUMENTS

| | | |
|---|---|---|
| JP | 2011-211543 | 10/2011 |
| JP | 2015-128230 | 7/2015 |
| JP | 2015-170220 | 9/2015 |
| WO | 2006129474 | 5/2006 |

* cited by examiner

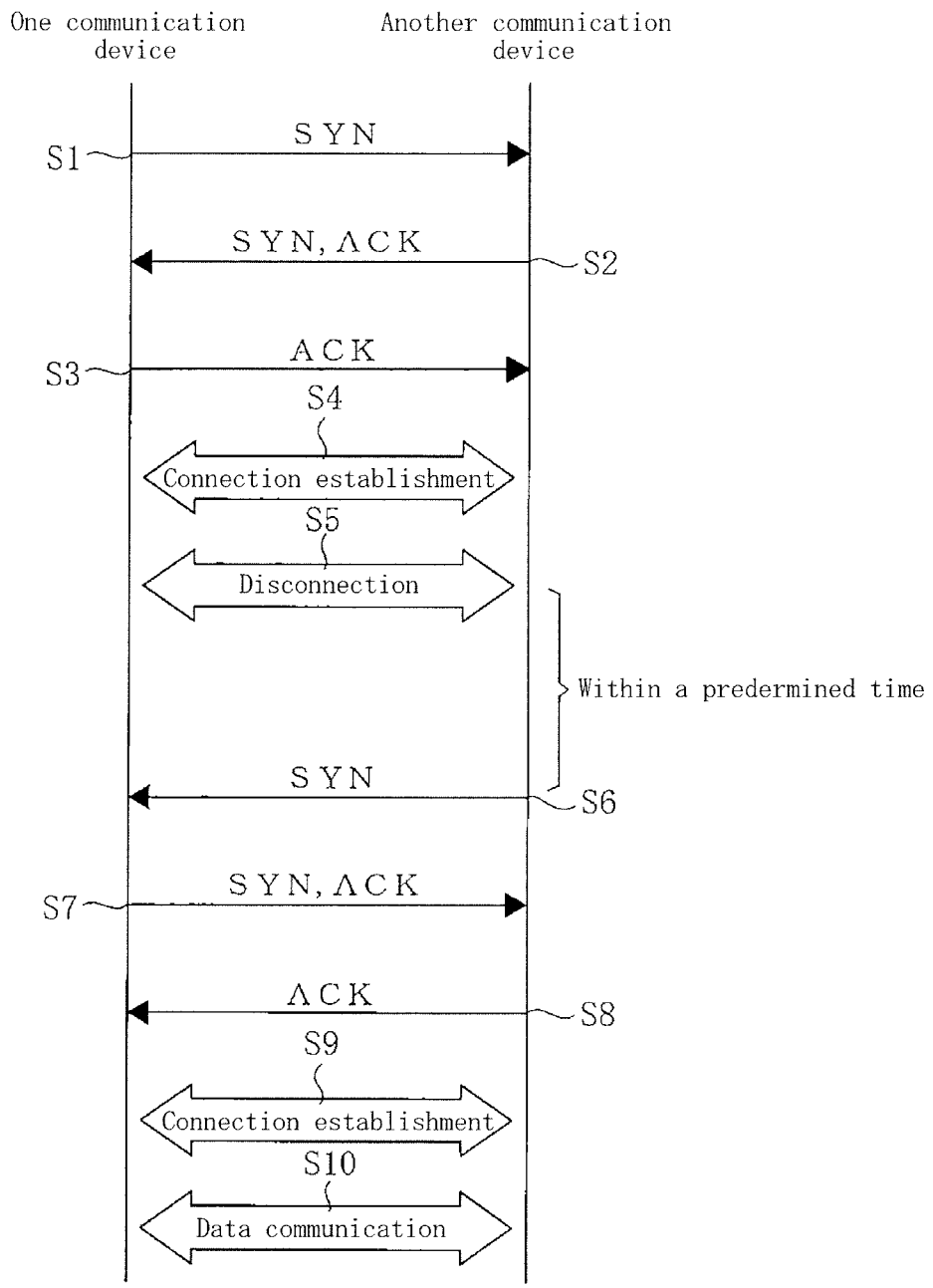

DATA COMMUNICATION METHOD

TECHNICAL FIELD

The present invention relates to a method of performing data communication in an IP network.

BACKGROUND ART

In recent years, M2M systems such as an automatic meter reading system for a gas meter or a water meter, a smart grid, a HEMS (Home Energy Management System), a remote monitoring system, and a sensor system and so on have become widespread. According to the M2M systems, machines are connected to each other through a communication network, and self-sustained monitoring and control, etc. are achieved.

In these M2M systems, normally, a central communication device (one machine) and one or more communication terminals (the other machine) are connected to an IP network through communication lines to each of which unique identification number (IP address) is assigned.

Then the communication line of the central communication device and the communication lines of one or more communication terminals are uniquely connected to each other by a three-way handshake based on the IP addresses so that data communication is performed between the central communication device and the one or more communication devices.

By the way, because the data communication in the IP network is normally performed through a plurality of communication rely devices, the data communication in the IP network has a problem of impersonation of IP address of an originating communication line, that is, a problem of spoofing. In the prior art, in order to prevent the damage of the spoofing and protect the data transmitted between the devices, a method of authenticating devices by generating an authentication key at every communication (see, for example, Patent Document 1) and a method of encrypting communications (see, for example, Patent Document 2) has been proposed so far.

However, in the prior art, it is necessary to provide a complicated and high-cost system for generation of the authentication key or encryption, and furthermore if the authentication key would be leaked or the secret code would be decoded, there is a possibility that secure data transmission cannot be guaranteed.

PRIOR ART DOCUMENTS

Patent Documents

Patent Document 1: JP 2015-170220 A
Patent Document 2 JP 2015-128230 A

SUMMARY OF THE INVENTION

Problems to be Solved by the Invention

It is, therefore, an object of the present invention to achieve secure and low-cost data communication in an IP network.

Means for Solving the Problems

In order to solve the object, the present invention provides a method of connecting a plurality of communication devices to an IP network through communication lines to each of which a unique identification number is assigned, registering in each of the plurality of communication devices the identification numbers of other communication devices allowed to communicate with the each of the plurality of communication devices, uniquely connecting the communication lines of the communication devices by a three-way handshake based on the identification numbers, and performing data communication between the connected communication devices, characterized by 1) activating from the communication line of one of the plurality of communication devices to the communication line of another of the plurality of communication devices, and, when a connection by three-way handshake is established between the activating and activated connection lines, disconnecting the connection without data communication, (2) sending a connection request signal from the activated communication line to the activating communication line within a predetermined time after the disconnection, (3) when the connection request signal arrives at the activating communication line, confirming that the communication device of the activated communication line is true if an identification number extracted from the connection request signal corresponds to the identification number of the communication line which has activated in the step (1) and the reception of the connection request signal is done within the predetermined time after the disconnection, and sending an acknowledge and connection request signal from the activating communication line to the communication line from which the connection request signal has been sent, and (4) when the acknowledge and connection request signal arrives at the activated communication line, determining that the communication device of the activating communication line is true, and sending an acknowledge signal from the activated communication line to the communication line from which the acknowledge and connection request signal has been sent, so that the connection by three-way handshake is established again between the activating and activated communication lines so as to perform the data communication.

Here, a term "IP network" means a packet communication network such as the Internet or an intranet (WAN and LAN etc.) which adopts an IP (Internet Protocol) (the same hereinafter). Also, the connection request signal is written as "SYN" (an abbreviation of "Synchronize") and the acknowledge signal is written as "ACK" (an abbreviation of "Acknowledge").

According to a preferred embodiment of the present invention, one or more ISP (Internet Service Provider) networks of the IP network are registered in a group beforehand, and the communication line of each of the plurality of communication devices is connected to access points of the one or more ISP networks registered in the group, and the data communication is performed within one or more closed networks formed by the one or more ISP networks registered in the group.

According to another preferred embodiment of the present invention, one of the plurality of communication devices is a central communication device and one or more remaining communication devices of the plurality of communication devices are independent communication terminals or communication terminals configuring at least one group of communication terminals, and the data communication performs between the central communication device and the one or more independent communication terminals or the one or more communication terminals configuring the at least one group, wherein a plurality of the identification numbers are assigned to the communication line of the central communication device while the identification number is assigned to the respective communication lines of the independent communication terminals and the respective communication lines of the communication terminals configuring the at least one group, wherein each of the plurality of the identification numbers assigned to the communication line of the central communication device corresponds to each of the independent communication terminals or each of the communication terminals configuring the at least one group, and the identification numbers of the communication lines of the respective independent communication terminals and the respective communication terminals configuring the at least one group are registered in the central communication device beforehand, and the corresponding identification number of the communication line of the central communication device is registered in each of the independent communication terminals and each of the communication terminals configuring the at least one group beforehand, wherein, when the independent communication terminals or the communication terminals configuring the at least one groups are not in use, the identification numbers of the communication lines of the corresponding communication terminals are deleted from the registration of the central communication device, or, when the independent communication terminals or the at least one group of communication terminals is not in use, the corresponding identification numbers of the communication line of the central communication device are deleted from the ISP network, wherein, when the central communication device fails to respond to a predetermined number of activations or an activation for a predetermined time of period from the independent communication terminals or the communication terminals configuring the at least one group, the concerned independent communication terminals or the concerned communication terminals configuring the at least one group stop operation.

Effect of the Invention

According to the present invention, a communication line of one communication device activates a communication line of another communication device, and, when a connection by a three-way handshake is established between the activating and activated connection lines, the connection is disconnected once, and thereafter, while it is determined at the activated communication line if a response signal (acknowledge and connection request signal) from the activating communication line as a response to a call back signal (connection request signal) sent to the activating communication line at a predetermined timing arrives or not, it is determined at the activating communication line if a call back signal (connection request signal) from the activated communication line arrives or not, and thereby it is possible to easily and surely determine on both the activating side and activated side if there is impersonation of communication line. Then data communication is performed between the activating and activated communication lines only when both the activating and activated communication lines are validated.

Thus a secure data communication in an IP network can be achieved by a simple and low-cost configuration without a complicated and high-cost configuration such as the generation of the authentication key and the encryption and so on. Also, a conventional data communication in an IP network becomes more secure by sending an authentication key based on the data communication method of the present invention instead of a conventional method of certifying devices by generating an authentication key at every communication. Furthermore, a general-purpose communication system or a large scale data system becomes more secure by performing mutual authentication according to the present invention when data of the system to be protected or a memory area of the system to be protected is accessed.

BRIEF DESCRIPTION OF THE DRAWINGS

FIG. 1 is a sequence diagram of a data communication method according to the present invention.

BEST MODE FOR CARRYING OUT THE INVENTION

A preferred embodiment of the present invention will be explained below with reference to accompanying drawings. The present invention is based on a data communication system in which a plurality of communication devices are connected to an IP network through communication lines to each of which a unique identification number (IP address) is assigned, and the identification numbers are registered in each of the plurality of communication devices the identification numbers of other communication devices allowed to communicate with the concerned communication device, and the communication lines of the communication devices are uniquely connected to each other by a three-way handshake based on the identification numbers, and thereby data communication is performed between the connected communication devices.

FIG. 1 is a sequence diagram of a data communication method according to the present invention. Referring to FIG. 1, according to the data communication method of the present invention, a communication line of a communication device activates a communication line of another communication device based on the registered IP addresses, and the activating and activated communication lines are connected by a three-way handshake (S1-S4 of FIG. 1).

A process of this connection is as follows. First of all, the activating communication line sends a SYN packet (connection request signal) to the activating communication line (the activating communication line activates the activated communication line) (S1 of FIG. 1). The activated communication line at which the SYN packet (communication request signal) has arrived sends an ACK+SYN packet (acknowledge and connection request signal) to the activating communication line when the activation is done by the communication line with the registered IP address (S2 of FIG. 2). At this time, the communication device on the activated side only checks whether the activation is done by the communication line with the registered IP address or not, and it is not, therefore, determined if the communication device on the activating side is true or not.

The activating communication line at which the ACK+SYN packet (acknowledge and communication request signal) has arrived establishes a connection "from the activating side to the activated side" and sends an ACK packet (acknowledge signal) to the activated communication line (S3 of FIG. 1). The activated communication line at which the ACK packet (acknowledge signal) has arrived establishes a connection "from the activated side to the activating side". Thereby a connection is established between the activating and activated communication lines (S4 of FIG. 1). At this time, the communication line on the activating side checks that the communication line with the IP address to which has been sent is activated.

According to the present invention, when the connection by three-way handshake is established between the activating and activated connection lines, the connection is disconnected once without data communication (S5 of FIG. 1). The disconnection is performed by, for example, sending a FIN (an abbreviation of Finish) packet from the activated communication line to the activating communication line, sending ACK packet and FIN packet one after the other from the activating communication line to the activated communication line and sending an ACK packet from the activated communication line to the activating communication line so as to close the connection, or the disconnection is performed by, for example, causing a timeout.

Then, within a predetermined time after the disconnection, the activated communication line sends a SYN packet (connection request signal) as a call back signal to the activating communication line (the activated communication line activates the activating communication line) (S6 of FIG. 1).

When the SYN packet (connection request signal) arrives at the activating communication line, it is confirmed on the activating side that the communication device of the activated communication line is true if an identification number extracted from the SYN packet (connection request signal) corresponds to the identification number of the communication line which has activated (in the step S1) and the reception of the SYN packet (connection request signal) is done within the predetermined time after the disconnection, so that an ACK+SYN packet (acknowledge and connection request signal) is sent from the activating communication line to the communication line from which the SYN packet (connection request signal) has been sent (S7 of FIG. 1).

At this time, if the first establishment of connection is based on activation to a true communication line from a false communication device which impersonates another true communication line, a true communication device of the impersonated communication line does not have the information about the activation, so that the true communication device of the impersonated communication line destroys the arrived SYN packet (communication request signal) and does not respond to the arrived SYN packet (communication request signal) so as not to send an ACK+SYN packet (S7 of FIG. 1). Accordingly, the activated communication device is connected to neither the true communication device of the impersonated communication line nor the false communication device.

Then when the ACK+SYN packet (acknowledge and connection request signal) arrives at the activated communication line, it is confirmed on the activated side that the communication device of the activating communication line is true, and a connection "from the activated side to the activating side" is established so that the activated communication line sends an ACK packet (acknowledge signal) to the communication line from which the ACK+SYN packet (acknowledge and connection request signal) has been sent (S8 of FIG. 1). The activating communication line at which the ACK packet (acknowledge signal) has arrived establishes a connection "from the activating side to the activated side". Thereby the connection is established again between the activating and activated communication lines (S9 of FIG. 1) and data communication is performed between the connected communication devices (S10 of FIG. 1).

According to the data communication method of the present invention, a communication line of one communication device activates a communication line of another communication device, and, when a connection by a three-way handshake is established between the activating and activated connection lines, the connection is disconnected once, and thereafter, while it is determined at the activated communication line if a response signal (ACK+SYN packet) from the activating communication line as a response to a call back signal (SYN packet) sent to the activating communication line at a predetermined timing arrives or not, it is determined at the activating communication line if a call back signal (SYN packet) from the activated communication line arrives or not, and thereby it is possible to easily and surely determine on both the activating side and activated side if there is impersonation of communication line. Then data communication is performed between the connected communication devices only when both the activating and activated communication lines are validated.

Thus a secure data communication in an IP network can be achieved by a simple and low-cost configuration without a complicated and high-cost configuration such as the generation of the authentication key and the encryption and so on.

The data communication method according to the present invention can be applied to both a one-to-one communication and one-to-many communication. For example, when the communication device of the activating communication line is a central communication device and the communication devices of the activated communication lines are communication terminals, an M2M system can be composed of the central communication device and communication terminals each of which is connected to the central communication device through the IP network. In this case, according to the present invention, the communication terminals are protected from unauthorized access and the central communication device can provide to each of the communication terminals communication protected from unauthorized access. In addition, when the communication device on the activating side is the central communication device, the central communication device can detect an activation of a third party impersonating the central communication device and accordingly, a safe operation of the communication system is achieved.

Furthermore, the data communication method according to the present invention can be applied to high-speed, large-capacity data communication. It is also possible to avoid risk of leakage or decryption of an authentication key which is caused from long time use of the same authentication key by sending (providing) an authentication key valid only once (one-time password) according to the data communication method of the present invention. Moreover, decryption of encryption itself can be prevented by encrypting data to be transmitted and transmitting a part of the encrypted data according to the data communication method of the present invention.

Although the present invention has been explained based on a preferred embodiment thereof, the present invention is not limited to the embodiment and one skilled in the art can easily devise various modified embodiments within the scope of the claims of the present application.

For example, according to another preferred embodiment of the present invention, one or more ISP (Internet Service Provider) networks of the IP network are registered in a group beforehand, and the communication line of each of the plurality of communication devices is connected to access points of the one or more ISP networks registered in the group, and the data communication is performed within one or more closed networks formed by the one or more ISP networks registered in the group.

According to this embodiment, more secure and stable data communication is achieved because the data communication between the communication devices is performed within the one or more closed networks formed by the one or more ISP networks registered in the group.

According to further preferred embodiment of the present invention, one of the plurality of communication devices is a central communication device and one or more remaining communication devices of the plurality of communication devices are independent communication terminals or communication terminals configuring at least one group of communication terminals, and the data communication is performed between the central communication device and the respective independent communication terminals or the respective communication terminals configuring the at least one group.

A plurality of the identification numbers are assigned to the communication line of the central communication device while the identification number is assigned to the respective communication lines of the independent communication terminals and the respective communication lines of the communication terminals configuring the at least one group, and each of the plurality of the identification numbers assigned to the communication line of the central communication device corresponds to each of the independent communication terminals or each of the communication terminals configuring the at least one group.

The identification numbers of the communication lines of the respective independent communication terminals and the respective communication terminals configuring the at least one group are registered in the central communication device beforehand, and the corresponding identification number of the communication line of the central communication device is registered in each of the independent communication terminals and each of the communication terminals configuring the at least one group beforehand.

Then, when the independent communication terminals or the communication terminals configuring the at least one group are not in use, the identification numbers of the communication lines of the corresponding communication terminals are deleted from the registration of the central communication device, or, when the independent communication terminals or the at least one group of communication terminals is not in use, the corresponding identification numbers of the communication line of the central communication device are deleted from the ISP network. On the other hand, when the central communication device fails to respond to a predetermined number of activations or an activation for a predetermined time of period from the independent communication terminals or the communication terminals configuring the at least one group, the concerned independent communication terminals or the concerned communication terminals configuring the at least one group stop operation. After that, in the ISP network to which the concerned communication terminals are connected, the identification numbers of the corresponding communication lines are deleted.

In this way, when the independent communication terminals or the at least one group of communication terminals is not in use, the concerned identification numbers registered in the central communication device are deleted. On the other hand, when the central communication device does not respond to a predetermined number of activations or an activation for a predetermined time of period from the independent communication terminals or the at least one group, the concerned independent communication terminals or the concerned group stops operation.

According to this embodiment, in an M2M system composed of a central communication device, a plurality of independent communication terminals and at least one group of communication terminals which are connected to an IP network, it is possible to facilitate management in the central communication device when the installation and removal of the independent communication terminals and the group of communication terminals occurs.

The invention claimed is:

1. A method of connecting a plurality of communication devices to an IP network through communication lines to each of which a unique identification number is assigned, registering in each of the plurality of communication devices the identification numbers of other communication devices allowed to communicate with the each of the plurality of communication devices, uniquely connecting the communication lines of the communication devices by a three-way handshake based on the identification numbers, and performing data communication between the connected communication devices, comprising:

(1) activating from the communication line of one of the plurality of communication devices to the communication line of another of the plurality of communication devices, and, when a connection by three-way handshake is established between an activating and activated connection lines, disconnecting the connection without data communication;

(2) sending a connection request signal from the activated communication line to the activating communication line within a predetermined time after the disconnection;

(3) when the connection request signal arrives at the activating communication line, confirming that the communication device of the activated communication line is true if when an identification number extracted from the connection request signal corresponds to the identification number of the communication line which has activated in the step (1) and the reception of the connection request signal is done within the predetermined time after the disconnection, and sending an acknowledge and connection request signal from the activating communication line to the communication line from which the connection request signal has been sent; and (4) when the acknowledge and connection request signal arrives at the activated communication line, determining that the communication device of the activating communication line is true, and sending an acknowledge signal from the activated communication line to the communication line from which the acknowledge and connection request signal has been sent, so that the connection by three-way handshake is established again between the activating and activated communication lines so as to perform the data communication.

2. The method according to claim 1, wherein one or more ISP (Internet Service Provider) networks of the IP network are registered in a group beforehand, and the communication line of each of the plurality of communication devices is connected to access points of the one or more ISP networks registered in the group, and the data communication is performed within one or more closed networks formed by the one or more ISP networks registered in the group.

3. The method according to claim 2, wherein one of the plurality of communication devices is a central communication device and one or more remaining communication devices of the plurality of communication devices are independent communication terminals or communication terminals configuring at least one group of communication terminals, and the data communication performs between the central communication device and the one or more independent communication terminals or the one or more communication terminals configuring the at least one group, wherein a plurality of the identification numbers are assigned to the communication line of the central communication device while the identification number is assigned to the respective communication lines of the independent communication terminals and the respective communication lines of the communication terminals configuring the at least one group, wherein each of the plurality of the identification numbers assigned to the communication line of the central communication device corresponds to each of the independent communication terminals or each of the communication terminals configuring the at least one group, and the identification numbers of the communication lines of the respective independent communication terminals and the respective communication terminals configuring the at least one group are registered in the central communication device beforehand, and the corresponding identification number of the communication line of the central communication device is registered in each of the independent communication terminals and each of the communication terminals configuring the at least one group beforehand, wherein, when the independent communication terminals or the communication terminals configuring the at least one groups are not in use, the identification numbers of the communication lines of the corresponding communication terminals are deleted from the registration of the central communication device, or, when the independent communication terminals or the at least one group of communication terminals is not in use, the corresponding identification numbers of the communication line of the central communication device are deleted from the ISP network, wherein, when the central communication device fails to respond to a predetermined number of activations or an activation for a predetermined time of period from the independent communication terminals or the communication terminals configuring the at least one group, the concerned independent communication terminals or the concerned communication terminals configuring the at least one group stop operation.

* * * * *